(12) United States Patent
Wagoner (10) Patent No.: US 8,228,697 B2
(45) Date of Patent: Jul. 24, 2012

(54) SYSTEMS, METHODS, AND APPARATUS FOR OPERATING A POWER CONVERTER

(75) Inventor: Robert Gregory Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 216 days.

(21) Appl. No.: 12/505,877

(22) Filed: Jul. 20, 2009

(65) Prior Publication Data
US 2011/0013432 A1 Jan. 20, 2011

(51) Int. Cl.
*H02M 3/24* (2006.01)
*H02J 3/36* (2006.01)

(52) U.S. Cl. ............................................. 363/95; 363/35

(58) Field of Classification Search .............. 363/34–37, 363/95
See application file for complete search history.

(56) References Cited

U.S. PATENT DOCUMENTS

| | | | |
|---|---|---|---|
| 4,390,940 A | 6/1983 | Corbefia et al. | |
| 6,058,035 A | 5/2000 | Madenokouji et al. | |
| 6,262,558 B1 | 7/2001 | Weinberg | |
| 6,291,764 B1 | 9/2001 | Ishida et al. | |
| 6,323,626 B1 | 11/2001 | Raiser | |
| 6,369,461 B1 | 4/2002 | Jungreis et al. | |
| 6,809,942 B2 | 10/2004 | Madenokouji et al. | |
| 6,921,985 B2 | 7/2005 | Janssen et al. | |
| 6,952,353 B2 | 10/2005 | Yan et al. | |
| 7,016,205 B2 | 3/2006 | Steigerwald et al. | |
| 2005/0284673 A1 | 12/2005 | Nakazawa et al. | |
| 2006/0267560 A1* | 11/2006 | Rajda et al. | 323/209 |
| 2007/0187955 A1* | 8/2007 | Erdman et al. | 290/44 |
| 2008/0007121 A1 | 1/2008 | Erdman et al. | |
| 2008/0062724 A1* | 3/2008 | Feng et al. | 363/17 |
| 2008/0140349 A1 | 6/2008 | Behera | |
| 2008/0278975 A1* | 11/2008 | Degen et al. | 363/21.18 |
| 2008/0303503 A1* | 12/2008 | Wolfs | 323/301 |
| 2009/0058086 A1* | 3/2009 | Arinaga et al. | 290/44 |
| 2009/0230689 A1* | 9/2009 | Burra et al. | 290/55 |
| 2009/0289502 A1* | 11/2009 | Batarseh et al. | 307/44 |
| 2010/0002475 A1* | 1/2010 | Folts et al. | 363/37 |

FOREIGN PATENT DOCUMENTS
EP 947904 B1 10/2003
(Continued)

OTHER PUBLICATIONS
Non-final Office Action for U.S. Appl. No. 12/505,858 mailed Aug. 26, 2010.
(Continued)

*Primary Examiner* — Adolf Berhane
*Assistant Examiner* — Jeffrey Gblende
(74) *Attorney, Agent, or Firm* — Sutherland Asbill & Brennan LLP (57) ABSTRACT

Embodiments of the invention can provide systems, methods, and apparatus for operating a power converter. According to one embodiment, a system for operating a power converter can be provided. The system can include a direct current (DC) power source with an output electrically coupled to an input of the power converter. The system can also include a controller operable to modify the performance of the DC power source through the power converter. As part of this modification, the controller can determine whether a low voltage ride through (LVRT) event exists in a load and can adjust the DC power source when a LVRT event occurs.

18 Claims, 5 Drawing Sheets

FOREIGN PATENT DOCUMENTS

WO     2007/140466 A2     12/2007

OTHER PUBLICATIONS

EP Search Report issued in connection with corresponding EP Patent Application No. 10169385.1 filed on Jul. 13, 2010.
Conroy J et al:"Low-Voltage ride-through of a full converter wind turbine with permanent magnet generator". vol. 1 No. 3, Sep. 10, 2007, pp. 182-189, XP006029514.
Pedro Rodriguez et al.:"Reactive Power Control for Improving Wind Turbine System Behavior Under Grid Faults". IEEE Transactions on Power Electronics, IEEE Service Center, Piscataway, NJ, US, vol. 24 No. 7, Jul. 1, 2009, pp. 1798-1801, XP011264559.
El Moursi M et al:"High-performance voltage control scheme for wind park intergration". vol. 1 No. 3, Sep. 10, 2007, pp. 151-159, XP006029510.
Behnke M R et al: "Reduce Order Dynamic Model for Variable-Speed Wind Turbine with Synchronous Generator and Full Power Conversion Topology", Future Power Systems, 2005 International Conference on Amsterdam, The Netherlands Nov. 16-18, 2005, Piscataway, NJ, US, IEEE, Jan. 16, 2005 pp. 1-6, XP010897502.
Abbey C et al:"Short-term energy storage for wind energy applications". Conference record of the 2005 IEEE Industry applications conference fortieth IAS annual meeting Oct. 2-6, 2005 Kowloon, Hong Kong, China, Conference record of the 2005 IEEE Industry applications conference fortieth IAS Annual Meeting. vol. 3 No. 2, Oct. 2, 2005, pp. 2035-2042, XP010842675.
DC to DC Converter, Wikipedia: The Free Encyclopedia, Jun. 2, 2009, <http://en.wikipedia.org/wiki/DC_to_DC_converter>.
Disclosure Statement Under 37 C.F.R. §1.56 as filed Jul. 24, 2009.

* cited by examiner

SYSTEMS, METHODS, AND APPARATUS FOR OPERATING A POWER CONVERTER

FIELD OF THE INVENTION

The invention relates to power conversion, and more specifically, to systems, methods, and apparatus for operating a power converter.

BACKGROUND OF THE INVENTION

A direct current (DC) power source, such as a fuel cell or photovoltaic cell, typically produces a low voltage at a high current. While these DC power sources provide a source of power, the power can be inconsistent, varying with local operating conditions. Because many power applications require a relatively stable source of alternating current (AC) power to operate, power conversion systems have been adapted to modify the power being supplied from DC power sources. While power conversion systems have been adapted to regulate the power from DC power sources, power conversion systems have not been adapted to modify DC power sources according to instabilities in power demands, especially when the power demands change considerably for short periods of time.

For example, when a fault condition occurs in a utility power grid, the line voltage at the output of a power conversion system can drop significantly, as will the power required of the system. During these periods, sometimes referred to as low voltage ride through (LVRT) events, conventional power conversion systems have been adapted to disconnect from the grid. Once the LVRT event has passed, a conventional power conversion system can be reconnected.

Since sources of power are repeatedly coming on and off the utility power grid during these LVRT events, the continual disconnection and reconnection of conventional power conversion systems can cause relative instability. As sources of power come on and off line, the source of power available on the grid can fluctuate, causing frequency swings or even large system wide instabilities. When extensive enough, power can be disrupted to large regions, affecting large numbers of utility customers.

Thus, there is a need for a power conversion system that can withstand a LVRT event without being disconnected from the utility power grid or other load. There is a need for systems, methods, and apparatus for operating a power converter.

BRIEF DESCRIPTION OF THE INVENTION

Certain embodiments of the invention can address some or all of the needs described above. Certain embodiments of the invention are directed to systems, methods, and apparatus for operating a power converter in a power distribution system. According to one embodiment, a method for operating a power converter can be provided. The method can include operating a direct current (DC) power source at a first operating point using the power converter. The method can include with determining whether a low voltage ride through (LVRT) event exists in association with a load based at least in part on a voltage associated with the power distribution system. The method can include with adjusting the DC power source to a second operating point when a LVRT event exits.

According to another embodiment of the invention, a system for operating a power converter can be provided. The system can include a DC power source with an output electrically coupled to an input of the power converter. The system can also include a controller for operating the DC power source through the power converter. The controller can determine whether a LVRT event exists based at least in part on a voltage associated with the power distribution system and can adjust the DC power source when a LVRT event occurs.

According to yet another embodiment of the invention, an apparatus for operating a power converter in a power distribution system can be provided. The apparatus can comprise at least one controller for operating a DC power source at a first operating point. The controller can determine whether a LVRT event exists based on a voltage associated with a power distribution system. In response to a LVRT event, the controller can adjust the DC power source to a second operating point.

Other embodiments and aspects of the invention will become apparent from the following description taken in conjunction with the following drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

Figure 1:
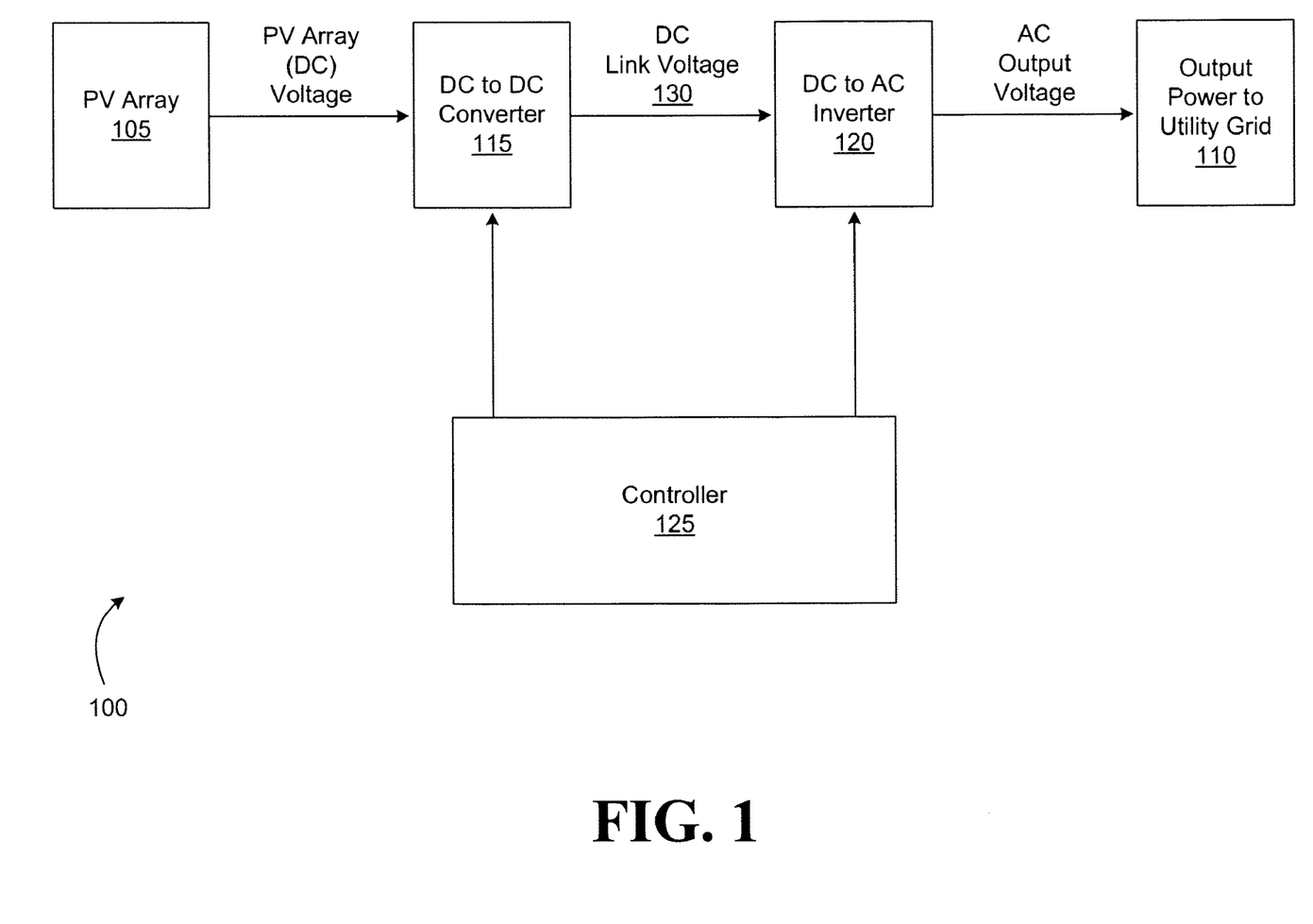
FIG. 1 illustrates a system for operating a power converter in a power distribution system according to one embodiment of the invention.

FIG. 1 illustrates an exemplary system 100 for operating a power converter in a power distribution system. Exemplary system 100 can include a direct current (DC) power source, such as a photovoltaic cell, a fuel cell, an array of such cells, a battery, or the like. In the exemplary embodiment, photovoltaic array 105 can provide a source of DC power via a photovoltaic effect. Because the DC power produced by any individual cell is relatively low, photovoltaic cells can be linked together to form an array so that the power from individual photovoltaic cells can be combined.

Although photovoltaic cells, and fuel cells for that matter, can tap into an almost inexhaustible source of energy, such DC power sources do have shortcomings. One shortcoming is that the DC power output of such cells can be influenced by local conditions—such as temperature and the condition of the cells—making their power output variable. A second shortcoming is that photovoltaic cells and fuel cells provide a source of DC power, whereas most electric power loads require alternating current (AC) type power, meaning that DC power sources can not be directly connected to utility power grid 110 for general power purposes. The combination of their variable power output and the fact that their power output is DC-type power means that to incorporate DC power sources, like photovoltaic array 105 or other DC power sources like fuel cells, into the utility power grid 110 illustrated in FIG. 1, their DC power outputs must be regulated and converted to AC power. In system 100, these operations can be performed by electrically coupling photovoltaic array 105 to DC-to-DC converter 115 and DC-to-AC inverter 120.

The combination of DC-to-DC converter 115 and DC-to-AC inverter 120, or collectively the apparatus, can convert the electrical energy from photovoltaic array 105 to a relatively stable and reliable AC power source. More specifically, DC-to-DC converter 115 can be electrically coupled to photovoltaic array 105 and can condition the DC power provided from these sources to make the DC power more consistent. In one embodiment, DC-to-DC converter 115 can include the use of a switching type regulator that can regulate the DC voltage at some level using a form of pulse width modulation control. In another embodiment, DC-to-DC converter 115 can include a power converter, or step up converter, that is operable to boost the DC power provided by photovoltaic array 105 from a first voltage to a second voltage.

Because the DC-to-DC converter 115 provides relatively stable DC power, but not AC power, an inverter can convert the regulated DC power to AC power and can be included in system 100. In system 100, DC-to-AC inverter 120 can convert the relatively stable DC power produced by DC-to-DC converter 115 into AC power, such as a 60 Hz sinusoidal current waveform which can provide power to the utility grid 110.

Figure 2:
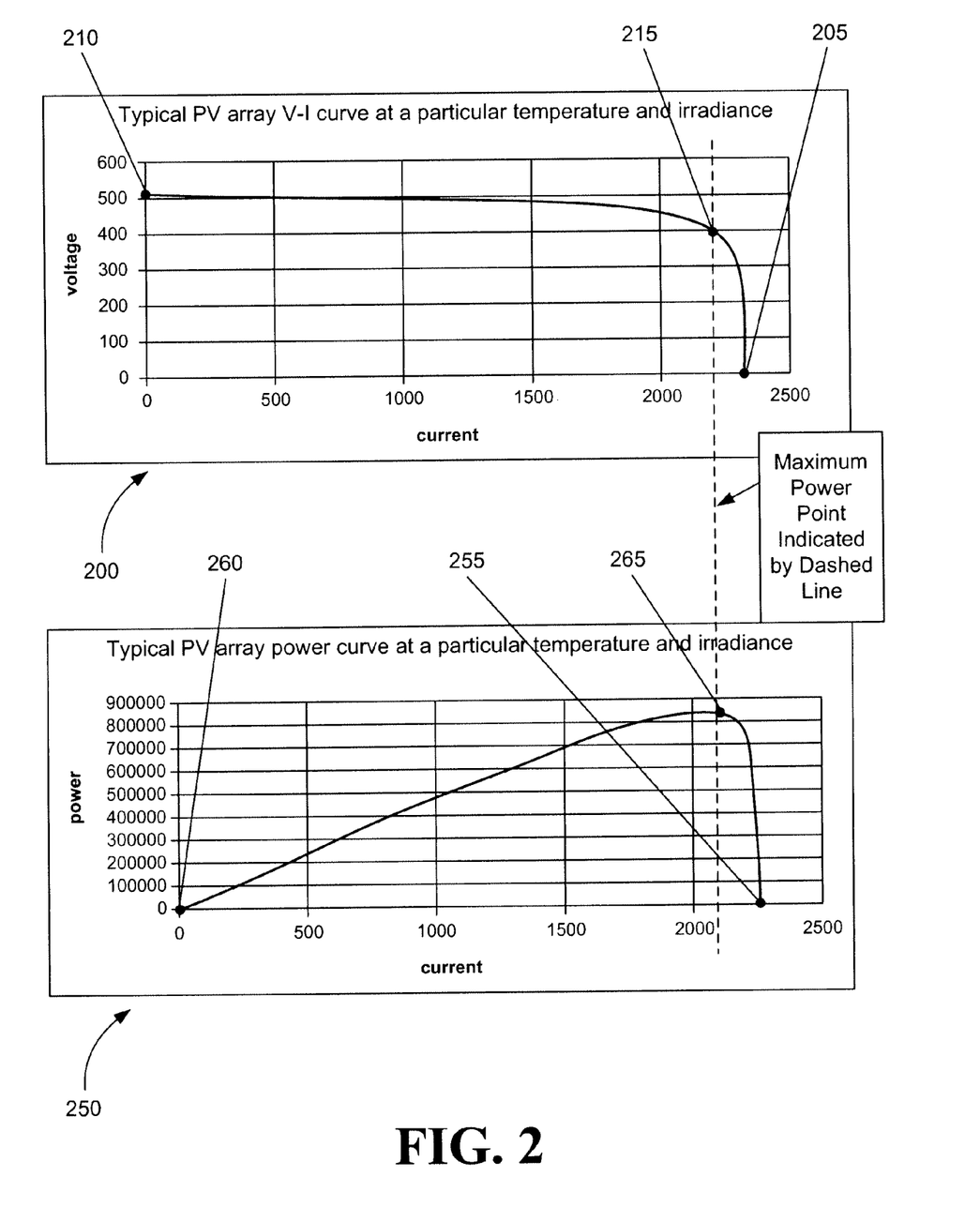
FIG. 2 illustrates a chart displaying an exemplary maximum power point for a direct current (DC) power source according to one embodiment of the invention.

As indicated above, the voltage, current, and power produced by DC power sources, such as the photovoltaic array 105, can vary according to ambient conditions. The electrical response of DC power sources can also depend on the electrical impedance of the load electrically coupled to the DC power source. This variability is illustrated in FIG. 2, where exemplary charts 200 and 250 are illustrated for photovoltaic array 105.

Chart 200 illustrates an exemplary current-voltage (I-V) curve for photovoltaic array 105 at a particular radiance and operating temperature. Chart 250 illustrates a corresponding current-power (I-P) chart. As shown at 205, photovoltaic array 105 produces its maximum current when there is no resistance in the circuit, that is, when the load comprises zero impedance. At 205, the voltage provided by photovoltaic array 105 is zero, as is photovoltaic array 105's DC power output at 255. Conversely, as shown at 210, small photovoltaic array 105 produces its maximum voltage when there is infinite resistance in the circuit, that is, when the load comprises a very large impedance. At 210, the current provided by photovoltaic array 105 is zero, as is the DC power output at 260.

Between these two extremes in load resistance, photovoltaic array 105 can exhibit the electrical response illustrated by the curve in chart 200 at a particular radiance and operating temperature. As illustrated in chart 250, the power available from photovoltaic array 105 at any point along the curve illustrated in chart 200 is the product of current and voltage at that point. At any particular temperature and radiance, photovoltaic array 105 has an operating point 265 that results in a maximum power output. In other words, at any particular temperature and radiance, photovoltaic array 105 can be characterized by a load impedance as shown at point 215 that results in the maximum power transfer to a load.

To find this load impedance which corresponds to a maximum power transfer point for photovoltaic array 105, methods for maximum power point tracking (MPPT) can be employed. In one embodiment, certain methods for MPPT can be embodied in a system and/or apparatus that can operate photovoltaic array 105, or other DC power source, in a manner that allows photovoltaic array 105 to produce its maximum power. Such a system and/or apparatus can include controller 125.

Controller 125 can be adapted to modify the operating characteristics of DC-to-DC converter 115 and/or DC-to-AC inverter 120. In the exemplary embodiment, controller 125 can modify certain characteristics of DC-to-DC converter 115 and/or DC-to-AC inverter 120 to cause the load impedance, as experienced by photovoltaic array 105, to vary. With this varying impedance, the power provided by photovoltaic array will also vary until the load impedance provided through controller 125 to photovoltaic array 105 corresponds to the maximum power point. The maximum power point can be a first operating point for photovoltaic array 105.

Controller 125 can be implemented using hardware, software, or a combination thereof for performing the functions described herein. By way of example, controller 125 can be a processor, an ASIC, a comparator, a differential module, or other hardware means. Controller 125 can also comprise software or other computer-executable instructions that may be stored in a memory and may be executable by a processor or other processing means.

While in general it may be desirable to operate a DC power source like photovoltaic array 105 at its maximum power point, there can be specific instances when this is not the case. One such instance can be when a fault condition occurs or when there is a change in load condition. A fault condition can be defined as a utility disturbance that causes the voltage at the load, or on a utility transmission line, to decrease significantly for a short amount of time. Such faults can have many causes such as lightning, wind storms, or the inadvertent grounding of phase conductors. In another instance, a significant change in load conditions can cause a considerable reduction in voltage for a momentary period of time. In general, both instances can be referred to as a low voltage ride through (LVRT) event.

When a LVRT event occurs, the power output of system 100 can decrease significantly while the current demands can remain very high. This significant increase in current could cause damage to certain system components. Partly for this reason, in conventional systems, damage can be prevented or otherwise minimized by physically disconnecting system 100 from the utility power grid 110, such as through a circuit breaker. Once the LVRT event has passed, the circuit breaker can be closed and the system reconnected to the grid. The disconnecting and reconnecting of system 100 to utility power grid 110, however, can be a source of instability.

During a LVRT event, it may no longer be desirable to operate photovoltaic array 105 at the maximum power point 265 shown in FIG. 2. Rather, it may be desirable to operate photovoltaic array 105 at a reduced power output level and an increased current level, both corresponding to the temporary requirements at the load. In other words, during a LVRT event, it may be desirable to operate a DC power source, such as photovoltaic array 105, on the high current side of the maximum power point 265, which can reduce the voltage and overall power output of the array. An exemplary reduced power operating point is illustrated in FIG. 3 at 355.

Figure 3:
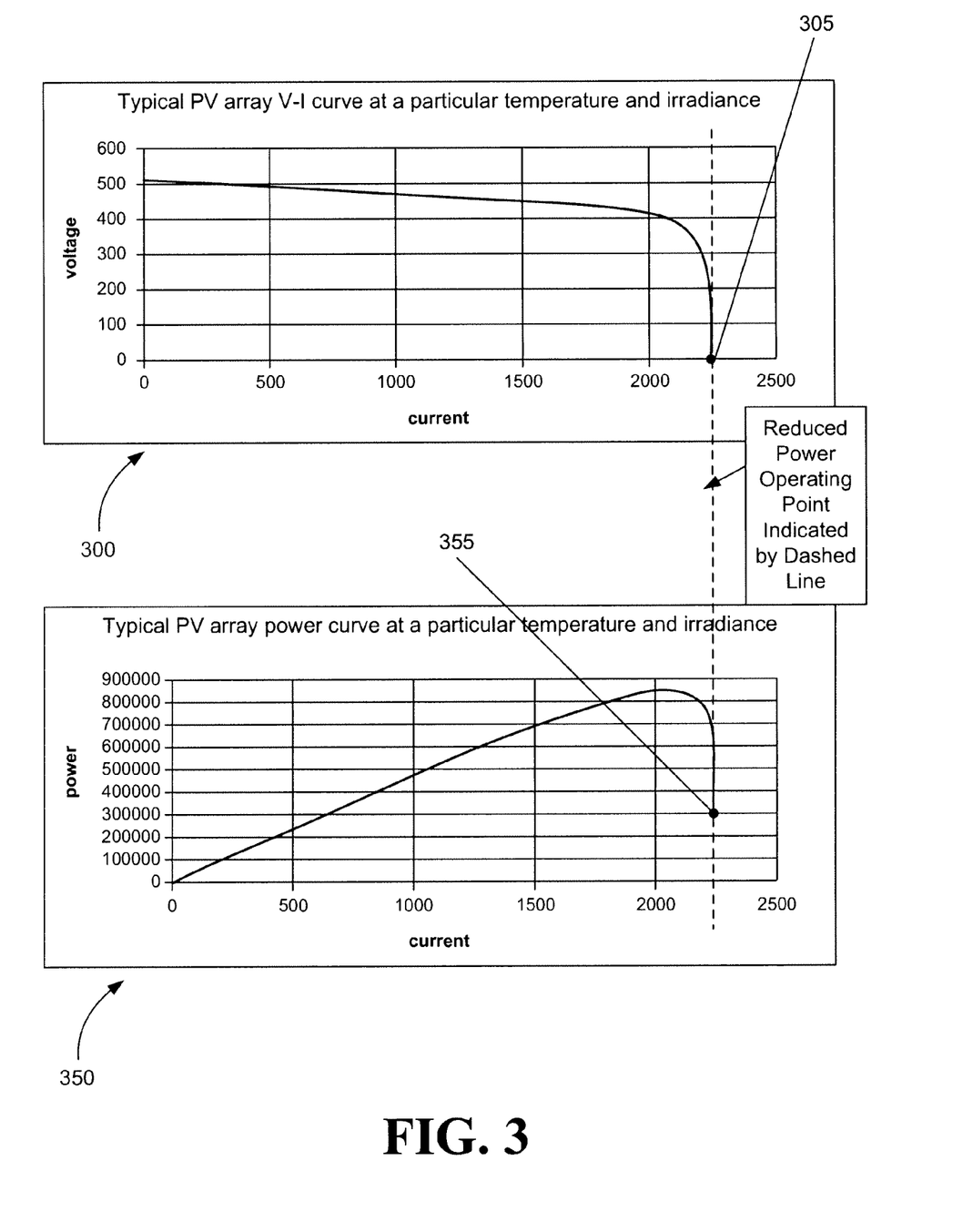
FIG. 3 illustrates a chart displaying an exemplary reduced power operating point for a DC power source according to one embodiment of the invention.

FIG. 3 provides a chart displaying an exemplary reduced power operating point for a DC power source. In chart 300 and chart 350, the desired operating parameters for a DC power source during a LVRT event are illustrated as an increased current operating point at 305 and a reduced power operating point at 355. These points can correspond to the temporary requirements at the load.

In accordance with one embodiment of the invention, system 100 can be adapted to determine the reduced power operating point 355. Following this determination, system 100 can be further adapted to operate during a LVRT event without being disconnected from utility power grid 110. In the exemplary embodiment, to partially meet these ends, controller 125 can be adapted to perform exemplary methods 400 and 500 illustrated in FIG. 4 and FIG. 5.

Figure 4:
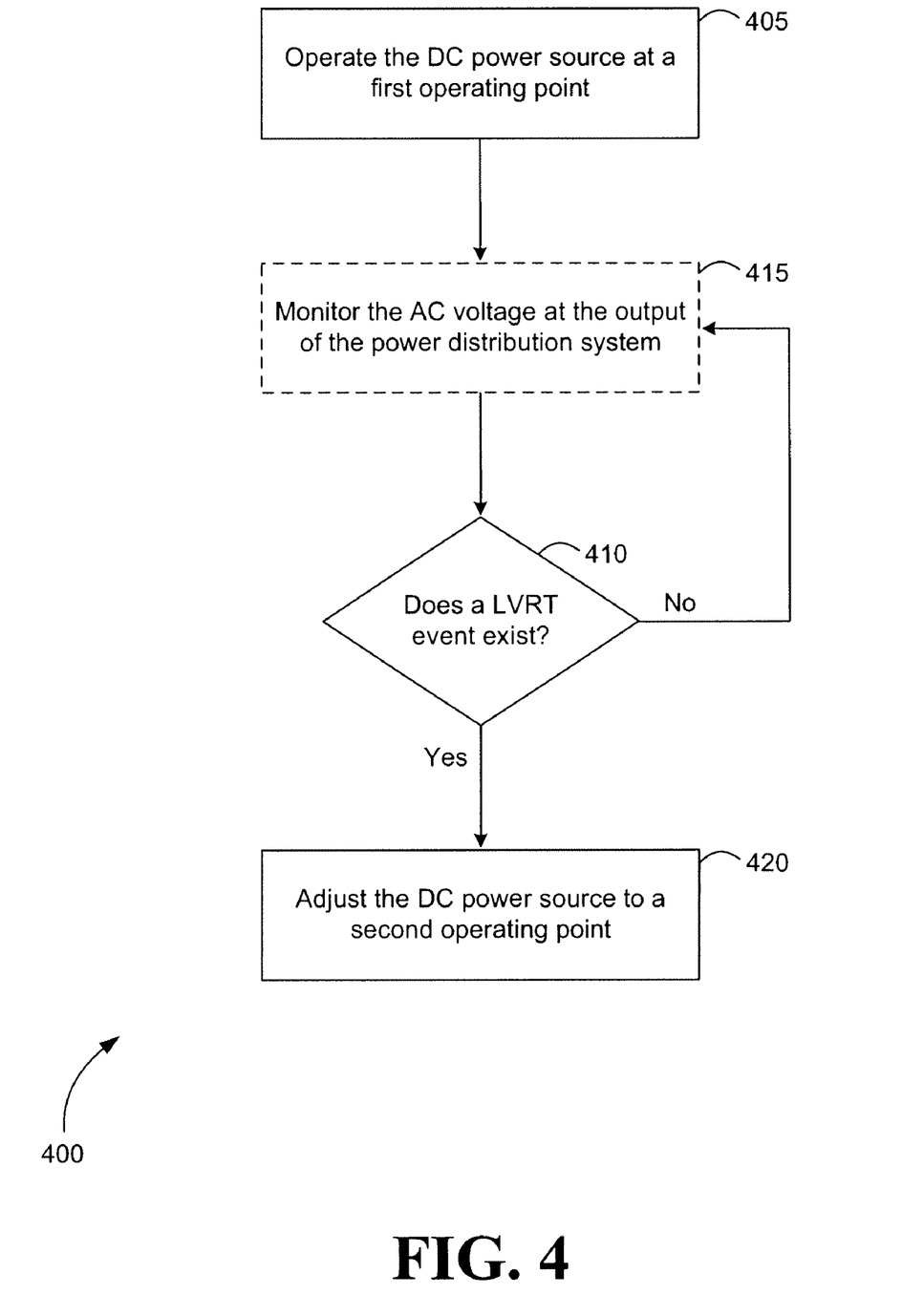
FIG. 4 illustrates an exemplary method for operating a power converter in a power distribution system according to one embodiment of the invention.
Figure 5:
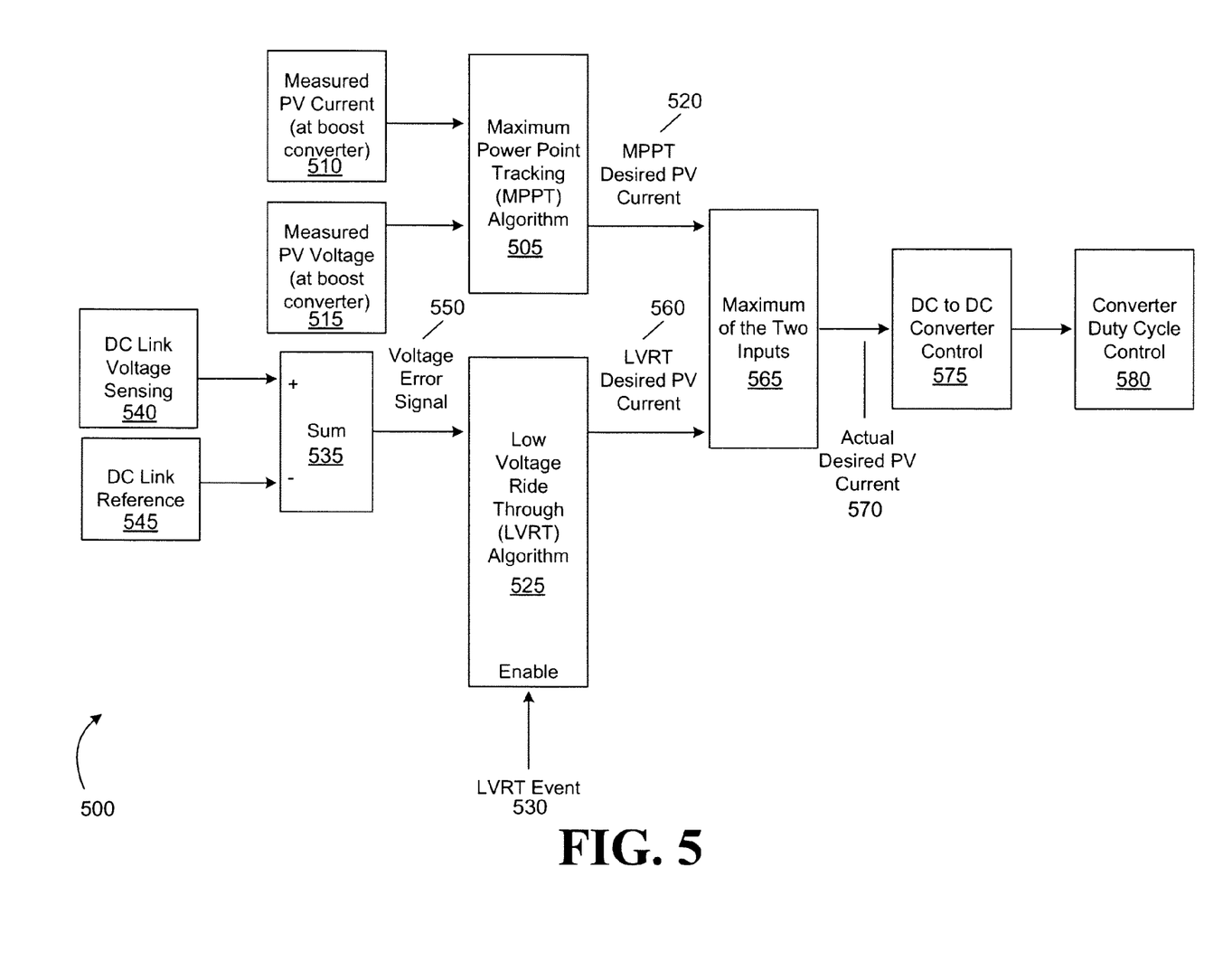
FIG. 5 illustrates an exemplary method for operating a power converter in a power distribution system according to another embodiment of the invention.

FIG. 4 illustrates an exemplary method 400 by which an embodiment of the invention may operate. Provided is a flowchart illustrating a method 400 for operating a power converter, such as the two-stage solar converter of FIG. 1, that can be part of a power conversion system. Method 400 can be implemented, at least partially, by a control system comprising one or more controllers, like controller 125, electrically connected to one or more DC-to-DC converters and/or DC-to-AC inverters, like those shown in FIG. 1. FIG. 5 illustrates a second exemplary method 500 for operating a power converter and is described in relation to FIG. 4 below.

While in the exemplary methods a DC-to-DC converter and/or a DC-to-AC inverter that are part of a two stage solar converter can be adapted to operate the voltage and current responses of a DC power source, such as a photovoltaic array or fuel array, it will be understood that references to such components are not limiting. Rather, references to specific components, voltages, and currents, such as those illustrated in FIG. 1, are provided to convey the scope of the invention to those skilled in the art.

Method 400 can begin at block 405 where a DC power source can be operated at a first operating point. A DC power source can correspond to any source of DC power. For instance, exemplary DC power sources can include, but are not limited to, a photovoltaic cell, a fuel cell, an array of such cells, a battery, or the like. In general, a first operating point can correspond to the power demands of a load, such as utility power grid 110, a code requirement, or a local condition. For instance, in exemplary method 500 of FIG. 5, a first operating point can correspond to a maximum power point for the DC power source, such as the maximum power point for photovoltaic array 105 in system 100. For photovoltaic array 105, the maximum power point can relate to environmental and local conditions, such as temperature and irradiance.

In exemplary method 500, the method can begin at block 505 where a MPPT algorithm can be implemented with one or more controllers like controller 125. The MPPT algorithm can determine a maximum power point related to a DC power source like photovoltaic array 105 and can extract the maximum power available from the DC power source. In the exemplary embodiment, the MPPT algorithm can base for a determination of the maximum power point on a measured current 510 and a measured voltage 515 from photovoltaic array 105. For example, the MPPT algorithm can use the measured current 510 and measured voltage 515 from the array 105 to determine the array's maximum power point based on the array's one or more performance curves.

Once the maximum power point for photovoltaic array 105 is determined, a desired current for photovoltaic array 105 can be defined at block 520. In the exemplary embodiment, a desired current for photovoltaic array 105 can be obtained by adjusting one or more characteristics of DC-to-DC converter 115. For example, in one embodiment, DC-to-DC converter 115 can include a switching type regulator that can regulate the DC voltage and DC current provided by photovoltaic array 105 using a form of pulse width modulation control. In this embodiment, adjusting one or more characteristics of DC-to-DC converter 115 can comprise adjusting one or more duty cycles associated with the pulse width modulation control.

At block 410, method 400 of FIG. 4 can continue by determining whether a LVRT event exists. It will be appreciated that in some embodiments, determining the existence of a LVRT event can comprise monitoring for a LVRT event as well. That is, in some embodiments of method 400, block 415 related to monitoring a voltage at a output of the power distribution system can be included. In the exemplary method 500 of FIG. 5, a monitoring step is included at block 525 where a LVRT algorithm can be implemented. As with MPPT algorithm 505, LVRT algorithm 525 can be implemented with one or more controllers like controller 125.

At block 525, a LVRT enable signal 530 can monitor whether a LVRT event exists. LVRT enable signal 530 can be associated with one or more outputs of the power conversion system. For example, LVRT enable signal 530 can be associated with an output at the connection to utility power grid 110. Because a LVRT event causes the AC voltage on either one phase or three phases at the connections to utility power grid 110 to decrease to a low level, LVRT enable signal 530 can be based on the output voltage of any phase being below a threshold voltage. The threshold voltage can be determined in advance or dynamically determined based on system parameters and should be determined so as not to trigger a LVRT algorithm 525 unnecessarily.

In other embodiments, LVRT enable signal 530 can be associated with an output of a component of the power conversion system. In system 100 of FIG. 1, for example, LVRT enable signal 530 can be associated with the output of DC-to-AC inverter 120, or even DC-to-DC converter 115. When associating LVRT enable signal 530 with the output of DC-to-AC inverter 120, it can be associated similarly to the association made above to connections to the utility power grid 110 since, like utility power grid 110, when a LVRT event exits, the voltage output at DC-to-AC inverter 120 can decrease.

When associating LVRT enable signal 530 with the output of DC-to-DC inverter 115, though, the association need not be similar. The association need not be similar because during a LVRT event, while the AC voltage at the output of the power conversion system decreases, the DC link voltage can increase. Hence, with reference to system 100 in FIG. 1, a LVRT event can cause DC link voltage 130 to increase. Thus, LVRT enable signal 530 can be associated with an increase in the voltage at the output of DC-to-DC converter 115.

It will be appreciated that while LVRT enable signal 530 is associated with block 525 in the exemplary embodiment, LVRT enable signal 530 can be associated with other elements of method 500 in accordance with the teachings of the invention. For example, LVRT enable signal 530 could be associated with block 535 or block 565 so that MPPT algorithm 505 will control the associated system response until the LVRT enable signal 530 indicates a LVRT condition exists. Other embodiments also exist, and while only a few embodiments of LVRT enable signal 530 are presented in the context of these exemplary embodiments, the invention is not limited to the embodiments so described.

As previously indicated, when a LVRT event exists, it may be desirable to operate a DC power source at a reduced power output level and an increased current level for the duration of the event. At block 420, method 400 of FIG. 4 can continue by adjusting the DC power source to a second operating point corresponding to the temporary requirements associated with the LVRT event. This second operating can be determined in advance or it can be determined dynamically, such as by determining a reduced power operating point associated with the LVRT event. In this vein, method 500 of FIG. 5 provides one embodiment for determining a reduced power operating point associated with the LVRT event.

At block 525, the LVRT algorithm can determine a reduced operating point based at least in part on the difference between one or more inputs. For instance, with reference to system 100, one input can be the DC link voltage 130 as measured at a output of DC-to-DC converter 115. The second input can be a DC link reference voltage as shown at block 545. The DC link reference voltage can be determined in advance, such as defined as part of an operating code or as a system parameter.

Because the DC link voltage 130 can increase during a LVRT event, the voltage error signal 530 as determined at block 535 can increase as well. Using voltage error signal 530 as a reference, when LVRT algorithm 525 is employed by controller 125 in system 100, controller 125 can determine a desired current associated with photovoltaic array 105 that can align the DC link voltage 130 with the DC link reference voltage at block 545. This desired current can be obtained by changing one or more characteristics of DC-to-DC converter 115, such as a duty cycle associated with pulse width modulation control.

In this way, when method 500 is employed as part of system 100 or associated apparatus, controller 125 can provide a consistent DC link voltage 130 to system 100, meaning that in addition to determining a reduced operating point associated with a LVRT event, method 500 be used to provide additional features. More specifically, method 500 can enable power conversion system 100 to stay online during a LVRT event by providing continuous and/or regulated power to certain system components through DC link voltage 130. Consequently, because system 100 can stay online during both a LVRT event and normal operating conditions, system 100 can be adapted so that certain system controls associated with LVRT operation can be linked with system controls associated with normal operation, such as MPPT operation. One exemplary adaptation can be provided by method 500.

At block 565, system controls associated with LVRT operation and system controls associated with normal operation can be linked, such as via controller 125 in system 100. When employed as part of system 100, block 565 can be adapted to receive two inputs and to provide one output to DC-to-DC converter 115 via controller 125 at block 575. In the exemplary embodiment, block 565 can receive two desired current measures—one for MPPT operation and one for LVRT operation. Block 565 can then supply the greater of these two desired current measures to DC-to-DC converter control 575, which can be associated with modifying an operating characteristic of DC-to-DC converter 115, like a duty cycle at block 580.

When system 100 is operating normally, that is, when there is no LVRT event at the load, the LVRT enable signal 530 can minimize the LVRT desired current 560 so that block 565 can provide the MPPT desired current 520, as determined by MPPT algorithm 505, to DC-to-DC converter 115 via controller 125 at block 575. When there is a LVRT event, however, the LVRT algorithm 525 can be enabled. As the difference between DC link reference voltage 540 and DC link reference voltage 545 increases, so can the LVRT desired current 560. When LVRT desired current 560, as determined by LVRT algorithm 525, exceeds MPPT desired current 520, as determined by MPPT algorithm 505, method 500 can shift control from MPPT operation to LVRT operation. At this point, the LVRT algorithm 525 can modify the duty cycle of DC-to-DC converter 115 via controller 125 at block 580. When the LVRT event has passed, LVRT enable signal 530 again can minimize the LVRT desired current 560 so that system 100 can return to normal operation.

By including method 500, system 100 and associated apparatus can be adapted to continue to operate during normal operation and during LVRT events rather than to disconnect from the load or utility power grid 110. Because embodiments of the invention no longer require disconnection from a load or utility power grid during a LVRT event, embodiments of the invention can provide sources of power requiring less oversight from human operators, which is at least one technical effect of the invention. At the same time, embodiments of the invention can provide minimal disturbances in a load or utility power grid that are associated with the disconnection and reconnection of DC power supply systems, making such power systems more reliable. More reliable sources of power with less power grid disruption is at least one other technical effect of the invention.

It will be appreciated that the example elements of methods 400 and 500 are shown by way of example, and other process embodiments can have fewer or greater numbers of elements, and such elements can be arranged in alternative configurations in accordance with other embodiments of the invention. It will also be appreciated that the example elements of system 100 and associated apparatus are shown by way of example, and other system and apparatus embodiments can have fewer or greater numbers of elements, and such elements can be arranged in alternative configurations in accordance with other embodiments of the invention.

Many other modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for operating a power converter in a power distribution system, the method comprising:
  receiving, by the power converter, a first current determined at least in part by maximum power point tracking and a second current determined at least in part by a reduced power operating point, wherein the reduced power operating point comprises a power output level lower than a power output level associated with the first current and a current level higher than the first current;
  operating, via the power converter, at least one DC power source at a first operating point, wherein the first operating point is based at least in part on the first current;
  determining whether a low voltage ride through event exists based at least in part on a voltage associated with the power distribution system; and
  when a low voltage ride through event exists:
    adjusting, via the power converter, the at least one DC power source to a second operating point based at least in part on the reduced power operating point.

2. The method of claim 1, wherein the at least one DC power source comprises at least one of the following: a photovoltaic cell, a fuel cell, or a battery.

3. The method of claim 1, wherein operating the at least one DC power source at a maximum power point related to the at least one DC power source comprises adjusting at least one duty cycle of the power converter to operate the at least one DC power source at the maximum power point.

4. The method of claim 1, wherein the reduced power operating point is based at least in part on a voltage associated with an output of the power distribution system.

5. The method of claim 4, wherein adjusting the at least one DC power source to a reduced power operating point comprises adjusting at least one duty cycle of the power converter to operate the at least one DC power source at the reduced power operating point.

6. The method of claim 4, wherein the power distribution system comprises at least one DC-to-AC inverter with an input electrically coupled to an output of the power converter, and wherein the output of the power distribution system comprises an output of the at least one DC-to-AC inverter.

7. The method of claim 6, wherein the reduced power operating point is based at least in part on a voltage associated with the at least one DC-to-AC inverter.

8. The method of claim 7, wherein adjusting the at least one DC power source to a reduced power operating point comprises adjusting at least one duty cycle of the power converter.

9. A system for operating a power converter in a power distribution system, the system comprising:
   at least one DC power source with an output electrically coupled to an input of the power converter; and
   at least one controller operable to:
      receive, by the power converter, a first current determined at least in part by maximum power point tracking and a second current determined at least in part by a reduced power operating point, wherein the reduced power operating point comprises a power output level lower than a power output level associated with the first current and a current level higher than the first current;
      operate, via the power converter, the at least one DC power source at a first operating point, wherein the first operating point is based at least in part on the first current;
      determine whether a low voltage ride through event exists based at least in part on a voltage associated with the power distribution system; and
      when a low voltage ride through event exists:
      adjust, via the power converter, the at least one DC power source to a second operating point based at least in part on the reduced power operating point.

10. The system of claim 9, wherein the at least one DC power source comprises at least one of the following: a photovoltaic cell, a fuel cell, or a battery.

11. The system of claim 9, wherein the controller is further operable to adjust at least one duty cycle of the power converter to operate the at least one DC power source at the maximum power point.

12. The system of claim 9, wherein the second operating point is a reduced power operating point for the at least one DC power source.

13. The system of claim 12, wherein the controller is further operable to adjust at least one duty cycle of the power converter to operate the at least one DC power source at the reduced power operating point.

14. The system of claim 9, further comprising:
   at least one DC-to-AC inverter with an input electrically coupled to an output of the power converter and an output providing a source of AC power; and
   wherein the controller is operable to determine whether a low voltage ride through event exists based at least in part on a voltage associated with the output of the at least one DC-to-AC inverter.

15. The system of claim 14, wherein the first operating point is a maximum power point for the at least one DC power source.

16. The system of claim 15, wherein the controller is further operable to adjust at least one duty cycle of the power converter to operate the at least one DC power source at the maximum power point.

17. The system of claim 14, wherein the second operating point is a reduced power operating point for the at least one DC power source.

18. An apparatus for operating a power converter in a power distribution system, the apparatus comprising:
   at least one controller operable to:
      receive a first current based at least in part on maximum power point tracking of at least one DC power source and a second current based at least in part on a reduced power operating point, wherein the reduced power operating point comprises a power output level lower than a power output level associated with the first current and a current level higher than the first current; and
      when a low voltage ride through event exists:
         operate the at least one DC power source at a second operating point by reducing a power output level of the power converter to a power output level associated with the reduced power operating point and increasing a current level to a current level associated with the reduced power operating point.

* * * * *